United States Patent
Chowdhury

(10) Patent No.: US 6,745,718 B1
(45) Date of Patent: Jun. 8, 2004

(54) ANTI-SLIP AND FASTER MILKING TEATCUP LINER

(76) Inventor: Mofazzal H. Chowdhury, 1301 Baitinger Ct., Sun Prairie, WI (US) 53590-1550

( * ) Notice: Subject to any disclaimer, the term of this patent is extended or adjusted under 35 U.S.C. 154(b) by 0 days.

(21) Appl. No.: 10/359,846

(22) Filed: Feb. 7, 2003

Related U.S. Application Data

(60) Provisional application No. 60/355,103, filed on Feb. 8, 2002.

(51) Int. Cl.[7] .................................................. A01J 5/06
(52) U.S. Cl. .................................................. 119/14.47
(58) Field of Search ........................... 119/14.47, 14.48, 119/14.49, 14.5, 14.51, 14.52, 14.53, 14.24, 14.27

(56) References Cited

U.S. PATENT DOCUMENTS

| | | | |
|---|---|---|---|
| 948,440 A | * 2/1910 | Berberich | 119/14.18 |
| 3,096,740 A | 7/1963 | Noorlander | 119/14.52 |
| 3,104,647 A | * 9/1963 | Rackleff | 119/14.47 |
| 3,289,634 A | 12/1966 | Simons | 119/14.52 |
| 3,474,760 A | * 10/1969 | Siddal et al. | 119/14.49 |
| 3,659,558 A | 5/1972 | Noorlander | 119/14.52 |
| 3,967,587 A | 7/1976 | Noorlander | 119/14.49 |
| 4,269,143 A | 5/1981 | Erbach | 119/14.49 |
| 4,530,307 A | 7/1985 | Thompson | 119/14.49 |
| 4,537,152 A | 8/1985 | Thompson | 119/14.54 |
| 4,610,220 A | 9/1986 | Goldberg et al. | 119/14.47 |
| 5,178,095 A | 1/1993 | Mein | 119/14.47 |
| 5,218,924 A | 6/1993 | Thompson et al. | 119/14.02 |
| 5,291,853 A | 3/1994 | Steingraber et al. | 119/14.54 |
| 5,482,004 A | 1/1996 | Chowdhury | 119/14.52 |
| 5,493,995 A | 2/1996 | Chowdhury | 119/14.54 |
| 5,752,462 A | 5/1998 | Petersson | 119/14.47 |
| 6,039,001 A | 3/2000 | Sanford | 119/14.47 |
| 6,055,931 A | 5/2000 | Sanford, Jr. | 119/14.36 |
| 6,308,656 B1 | 10/2001 | Milbrath et al. | 119/14.47 |
| 6,435,132 B1 | 8/2002 | Milbrath et al. | 119/14.47 |

* cited by examiner

*Primary Examiner*—Yvonne R. Abbott
(74) *Attorney, Agent, or Firm*—Andrus, Sceales, Starke & Sawall, LLC

(57) ABSTRACT

A teatcup liner has an upper mouthpiece and a barrel depending downwardly from the upper mouthpiece, the barrel extending axially along an axis for receiving a teat inserted axially thereinto through the mouthpiece, the barrel being defined by a barrel wall having an inner surface defining a hollow interior in the barrel. An embossed pattern is provided along the inner surface of the barrel wall. A raised pattern provides faster milking, and reduces liner slip. A recessed pattern reduces liner slip.

18 Claims, 3 Drawing Sheets

ANTI-SLIP AND FASTER MILKING TEATCUP LINER

CROSS-REFERENCE TO RELATED APPLICATION

This application claims priority from Provisional U.S. patent application Ser. No. 60/355,103, filed Feb. 8, 2002.

BACKGROUND AND SUMMARY

The invention relates to teatcup liners for use in a teatcup assembly for milking a mammal.

As known in the prior art, a plurality of teatcups are connected to respective teats suspending from the udder of a mammal such as a cow. Each teatcup assembly has a teatcup liner or inflation around a respective teat and defining a milk flow passage within the liner below the teat, and a pulsation chamber outside the liner between the liner and the teatcup shell, for example U.S. Pat. Nos. 4,269,143, 4,530,307, 5,178,095, 5,218,924, 6,055,931, all incorporated herein by reference. The system has a milking cycle with an on portion and an off portion. Milk flows from the teat towards a milking claw during the on portion, and then to a storage vessel. During the off portion, the liner is collapsed around the teat, to aid in the circulation of body fluids. Vacuum is continuously applied to the milk flow passage within the liner. Vacuum is alternately and cyclically applied to the pulsation chamber between the liner and the teatcup shell, to open and close the liner, all as is known.

The present invention arose during continuing development efforts directed toward teatcup liners. The invention provides various constructions reducing liner slip of the liner along the teat, i.e. anti-creep. The invention also provides various constructions increasing milking speed and milk harvest, i.e. faster milking.

DETAILED DESCRIPTION OF THE INVENTION

Figure 1:
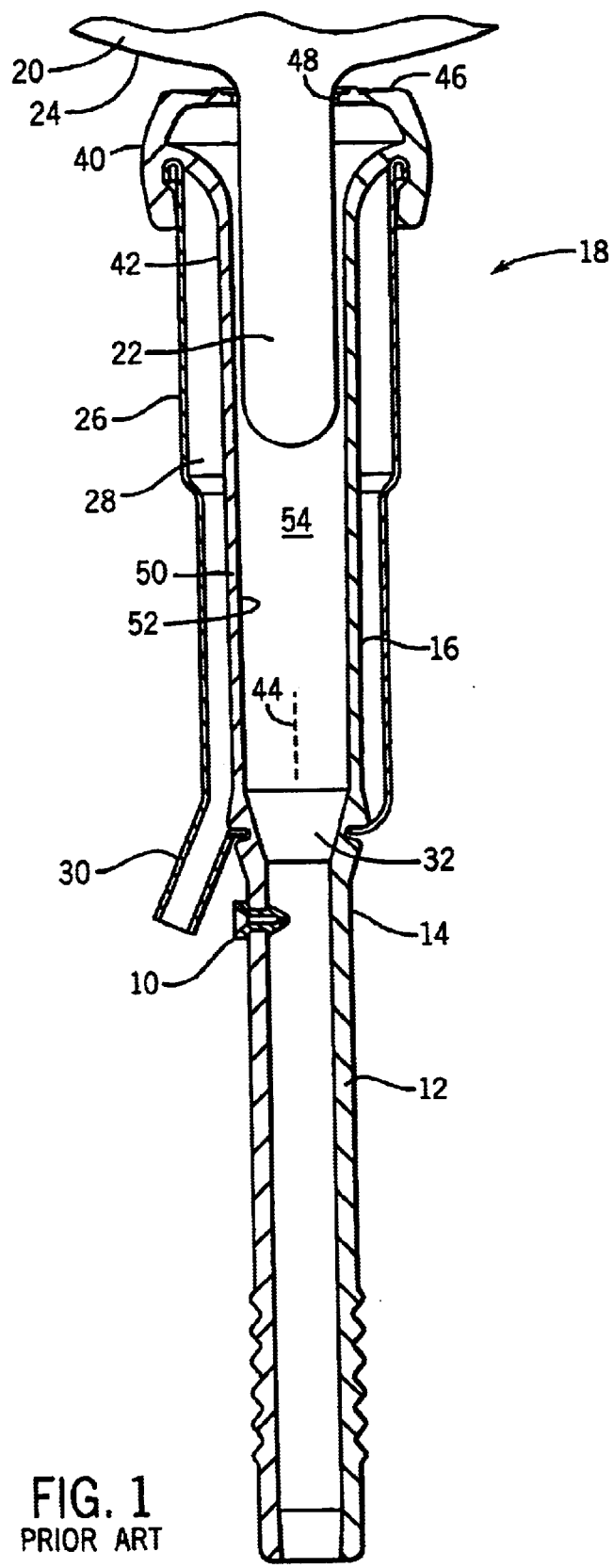
FIG. 1 is taken from U.S. Pat. No. 6,055,931 and is a side view partially in section of a teatcup assembly including a teatcup liner for milking a mammal.
Figure 2:
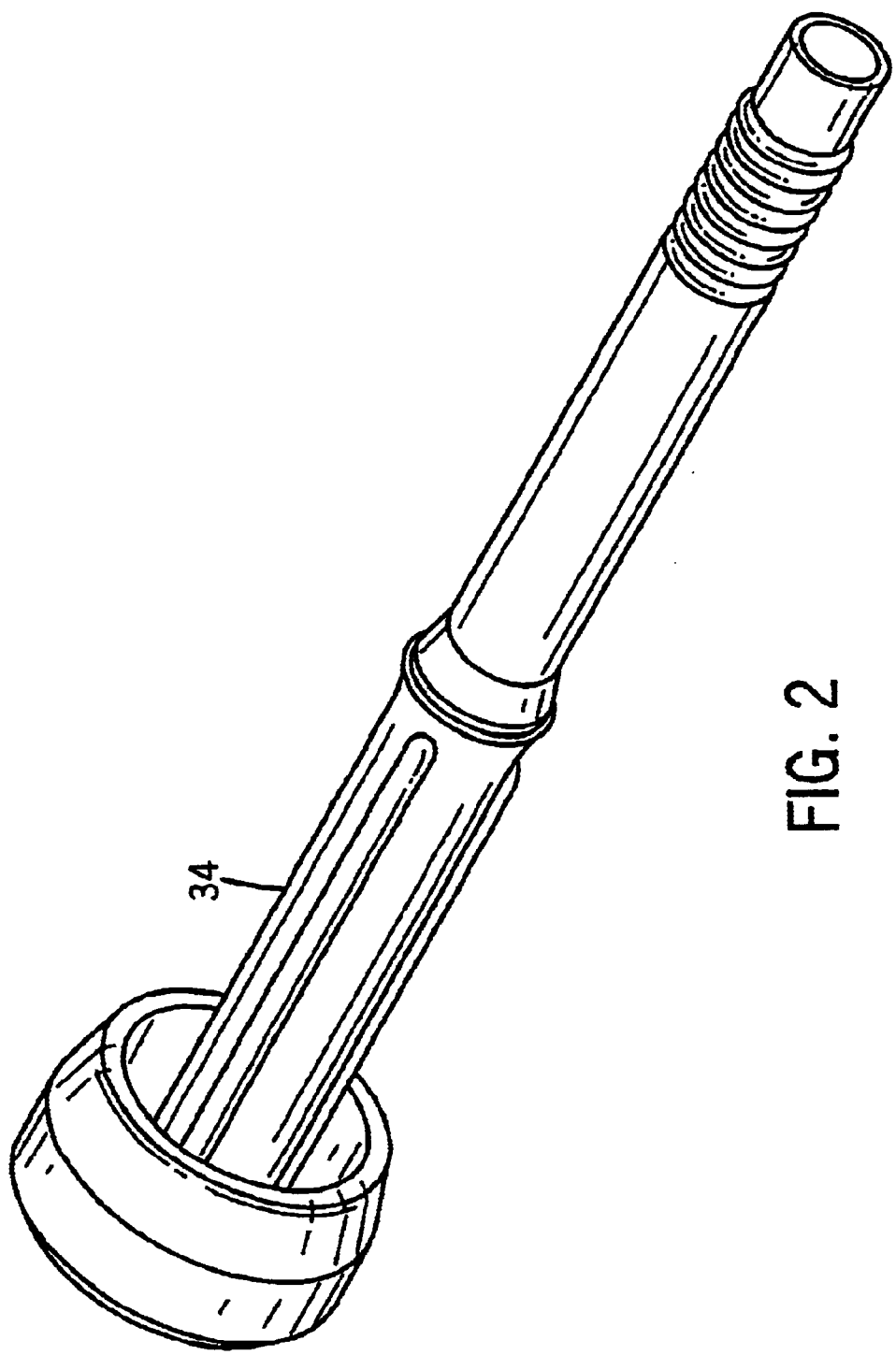
FIG. 2 is an isometric view of a teatcup liner.

FIG. 1 shows a teatcup assembly 18 for milking a mammal 20 such as a cow. Teat 22 suspending from udder 24 of the mammal extends into the liner. Teatcup shell 26 is typically a metal, or plastic, member defining an annular pulsation chamber 28 around liner 16 between the liner and the teatcup shell and having a pulsation port 30 for connection to a pulsator valve, as is known. Liner 16 is typically rubber or other flexible material. The lower end of milk tube portion 14 of the liner is connected to a claw, for example U.S. Pat. Nos. 4,537,152 and 5,291,853, incorporated herein by reference, which in turn supplies milk to a storage vessel. As noted above, vacuum is continuously applied to milk passage 32 within the liner through milk tube portion 14, and vacuum is alternately and cyclically applied to pulsation chamber 28 through port 30, to open and close liner 16 below teat 22, all as is known and for which further reference may be had to the above noted incorporated patents. An air vent plug 10 may be inserted through the wall 12 of the milk tube portion 14 of the teat liner, as is known, for example above noted incorporated U.S. Pat. No. 6,055,931. For furter background, a teatcup liner is illustrated in isometric view at 34 in FIG. 2.

Teatcup liner 16 includes an upper mouthpiece 40 and a barrel 42 depending downwardly from upper mouthpiece 40. Barrel 42 extends axially along an axis 44 for receiving teat 22 inserted axially thereinto through mouthpiece 40 through upper lip 46 at up aperture 48. Barrel 42 is defined by a barrel wall 50 having an inner surface 52 defining a hollow interior 54 in the barrel.

Figure 3:
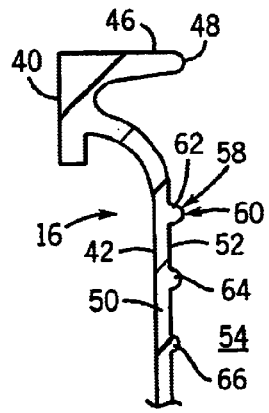
FIG. 3 is a sectional view of a portion of the teatcup liner of FIG. 1 modified in accordance with the present invention.
Figure 4:
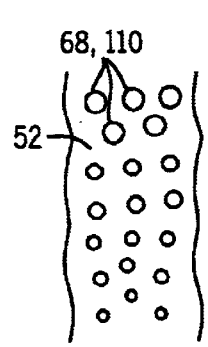
FIG. 4 is a side elevation view of a teatcup liner barrel wall modified in accordance with the invention.
Figure 5:
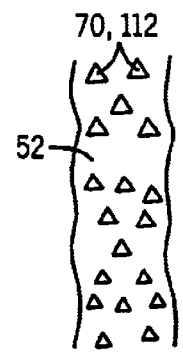
FIG. 5 is like FIG. 4 and shows another embodiment.
Figure 6:
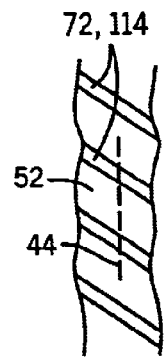
FIG. 6 is like FIG. 4 and shows another embodiment.
Figure 7:
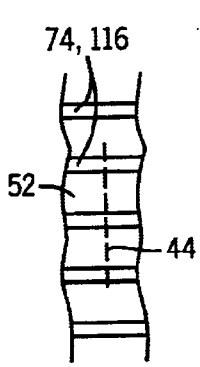
FIG. 7 is like FIG. 4 and shows another embodiment.
Figure 8:
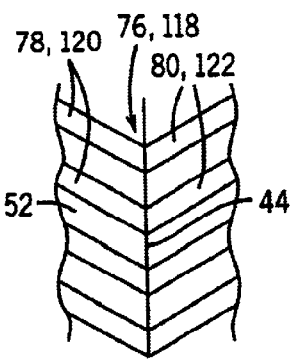
FIG. 8 is like FIG. 4 and shows another embodiment.
Figure 9:
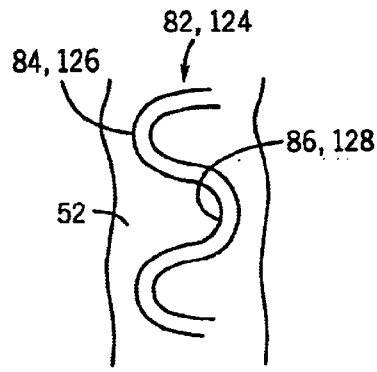
FIG. 9 is like FIG. 4 and shows another embodiment.
Figure 10:
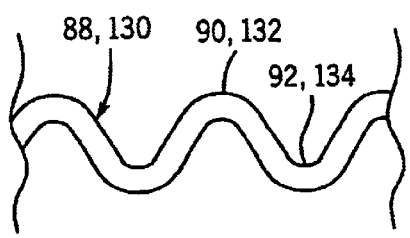
FIG. 10 is like FIG. 4 and shows another embodiment.

FIG. 3 shows a portion of the teatcup liner of FIG. 1 and uses like reference numerals from above where appropriate to facilitate understanding. FIG. 3 shows modifications to the liner in accordance with the present invention primarily for faster milking, and also for reducing liner slip or creep along the teat. An embossed pattern 58 is provided along inner surface 52 of barrel wall 50. The embossed pattern is a raised pattern 60 having portions such as 62, 64, 66 protruding into hollow interior 54. In one embodiment, the pattern is a plurality of raised dots as shown at 68 in FIG. 4, which dots may vary in size, and which may be non-hemispherical, for example the triangular dots 70 shown in FIG. 5. In another embodiment, the pattern is provided by a plurality of raised bars 72, FIG. 6, extending diagonally relative to axis 44. In another embodiment, the pattern is provided by a plurality of raised bars 74, FIG. 7, extending laterally relative to axis 44. In another embodiment, FIG. 8, the pattern is provided by a chevron pattern 76 having a first set of bars 78 extending diagonally relative to axis 44, and a second set of bars 80 extending diagonally relative to axis 44 and obliquely relative to the first set of bars 78. In a further embodiment, the pattern is a wave shape 82, FIG. 9, having a plurality of peaks 84 alternating with a plurality of valleys 86 axially spaced therebetween. In another embodiment, FIG. 10, the pattern is provided by a wave shape 88 having a plurality of peaks 90 alternating with a plurality of valleys 92 circumferentially spaced therebetween. In another embodiment, the pattern is provided by a plurality of lateral ribs or rings circumferentially extending around inner surface 52 of barrel wall 42 and axially spaced from each other, for example in FIG. 3 wherein protrusions 62, 64, 66 extend circumferentially around inner surface 52 of barrel wall 42, wherein for example, if barrel wall 42 is round in lateral cross-section, then protrusions 62, 64, 66 are annular rings. Raised ribs 62, 64, 66 may vary in size as shown, for example each rib has a radius of curvature taken from inner surface 52 of barrel wall 42, and the series of ribs $R_1$ through $R_n$, e.g. 62 through 66, progressing from an uppermost rib $R_1$, e.g. 62, through a lowermost rib $R_n$, e.g. 66, and wherein the radius of curvature of the ribs decreases from $R_1$ through $R_n$, as shown at the progressively decreasing radius of curvature of ribs 62 through 66. The embossed raised pattern with protruding portions provides a stiffer liner wall and faster milking. The protrusions also have a frictional effect for reducing liner slip.

Figure 11:
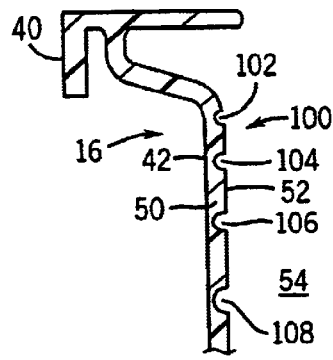
FIG. 11 is like FIG. 3 and shows another embodiment.

In further embodiments, the noted embossed pattern along inner surface 52 of barrel wall 42 is a recessed pattern 100, FIG. 11, for reduced liner slip. The teat tissue is sucked into the recesses of the pattern to provide the anti-slip feature. Pattern 100 has portions such as 102, 104, 106, 108 recessed into barrel wall 50 from hollow interior 54. FIG. 11 uses like reference numerals from above where appropriate to facilitate understanding. In one embodiment, pattern 100 has a plurality of dimples 110, FIG. 4, which appear comparable to dots 68 when viewed in side elevation, except that dots 68 are raised out of the page in FIG. 4, and dimples 110 are recessed into the page in FIG. 4. The dimples may vary in size, as shown, and may be non-hemispherical, for example as shown at 112 in FIG. 5, which dimples 112 appear comparable to dots 70 in side elevation view. In another embodiment, the pattern is provided by a plurality of slots 114, FIG. 6 extending diagonally relative to axis 44, which slots 114 appear comparable to bars 72 in side elevation view, except that bars 72 are raised out of the page in FIG. 6, and slots 114 are recessed into the page in FIG. 6. In another embodiment, the pattern is provided by a plurality of slots 116, FIG. 7, extending laterally relative to axis 44, which slots 116 appear comparable to bars 74 in side elevation view, except that bars 74 protrude out of the page in FIG. 7, and slots 116 are recessed into the page in FIG. 7. In another embodiment, the pattern is provided by a chevron pattern 118, FIG. 8, having a first set of slots 120 extending diagonally relative to axis 44, and a second set of slots 122 extending diagonally relative to axis 44 and obliquely relative to the first set of slots 120, wherein slots 120 and 122 appear comparable to bars 78 and 80 in side elevation view, except that bars 78 and 80 protrude out of the page in FIG. 8, and slots 120 and 122 are recessed into the page in FIG. 8. In another embodiment, the pattern is a wave shape 124, FIG. 9, having a plurality of peaks 126 alternating with a plurality of valleys 128 axially spaced therebetween, wherein wave shape 124 appears comparable to wave shape 82 in side elevation view, except that wave shape 82 protrudes out of the page in FIG. 9, and wave shape 124 is recessed into the page in FIG. 9. In another embodiment, the pattern is provided by a wave shape 130, FIG. 10, having a plurality of peaks 132 alternating with a plurality of valleys 134 circumferentially spaced therebetween, wherein wave shape 130 appears comparable to wave shape 88 in side elevation view, except that wave shape 88 protrudes out of the page in FIG. 10, and wave shape 130 is recessed into the page in FIG. 10. In another embodiment, the pattern is provided by a plurality of lateral grooves circumferentially extending around inner surface 52 of barrel wall 50 and axially spaced from each other, for example wherein recessed portions 102, 104, 106, 108 circumferentially extend all the way around inner surface 52 of barrel wall 50. For example, if barrel wall 50 is round in lateral cross-section, then recesses 102–108 are annular grooves. The grooves may vary in size as shown. For example, each grooves has a radius of curvature taken from inner surface 52 of barrel wall 50,and the series of grooves $G_1$ through $G_n$, for example 102 through 108, progresses from an uppermost groove $G_1$, e.g. 102, to a lowermost groove $G_n$, e.g. 108, wherein the radius of curvature of the grooves increases from $G_1$ at 102 to $G_n$ at 108.

It is recognized that various equivalents, alternatives and modifications are possible within the scope of the appended claims.

What is claimed is:

1. A teatcup liner comprising an upper mouthpiece and a barrel depending downwardly from said upper mouthpiece, said barrel extending axially along an axis for receiving a teat inserted axially thereinto through said mouthpiece, said barrel being defined by a barrel wall having an inner surface defining a hollow interior in said barrel, and an embossed pattern along said inner surface of said barrel wall, wherein said pattern is a raised pattern having portions protruding into said hollow interior, said pattern comprises a plurality of raised dots, and said dots vary in size.

2. A teatcup liner comprising an upper mouthpiece and a barrel depending downwardly from said upper mouthpiece, said barrel extending axially along an axis for receiving a teat inserted axially thereinto through said mouthpiece, said barrel being defined by a barrel wall having an inner surface defining a hollow interior in said barrel, and an embossed pattern along said inner surface of said barrel wall, wherein said pattern is a raised pattern having portions protruding into said hollow interior, said pattern comprises a plurality of raised dots, and said dots are non-hemispherical.

3. A teatcup liner comprising an upper mouthpiece and a barrel depending downwardly from said upper mouthpiece, said barrel extending axially along an axis for receiving a teat inserted axially thereinto through said mouthpiece, said barrel being defined by a barrel wall having an inner surface defining a hollow interior in said barrel, and an embossed pattern along said inner surface of said barrel wall, wherein said pattern is a raised pattern having portions protruding into said hollow interior, and said pattern comprises a plurality of bars extending diagonally relative to said axis.

4. A teatcup liner comprising an upper mouthpiece and a barrel depending downwardly from said upper mouthpiece, said barrel extending axially along an axis for receiving a teat inserted axially thereinto through said mouthpiece, said barrel being defined by a barrel wall having an inner surface defining a hollow interior in said barrel, and an embossed pattern along said inner surface of said barrel wall, wherein said pattern is a raised pattern having portions protruding into said hollow interior, and wherein said pattern comprises a chevron pattern comprising a first set of bars extending diagonally relative to said axis, and a second set of bars extending diagonally relative to said axis and obliquely relative to said first set of bars.

5. A teatcup liner comprising an upper mouthpiece and a barrel depending downwardly from said upper mouthpiece, said barrel extending axially along an axis for receiving a teat inserted axially thereinto through said mouthpiece, said barrel being defined by a barrel wall having an inner surface defining a hollow interior in said barrel, and an embossed pattern along said inner surface of said barrel wall, wherein said pattern is a raised pattern having portions protruding into said hollow interior, and wherein said pattern comprises a wave shape.

6. The teatcup liner according to claim 5 wherein said wave shape comprises a plurality of peaks alternating with a plurality of valleys axially spaced therebetween.

7. The teatcup liner according to claim 5 wherein said wave shape comprises a plurality of peaks alternating with a plurality of valleys circumferentialy spaced therebetween.

8. A teatcup liner comprising an upper mouthpiece and a barrel depending downwardly from said upper mouthpiece, said barrel extending axially along an axis for receiving a teat inserted axially thereinto through said mouthpiece, said barrel being defined by a barrel wall having an inner surface defining a hollow interior in said barrel, and an embossed pattern along said inner surface of said barrel wall, wherein said pattern is a raised pattern having portions protruding into said hollow interior, said pattern comprises a plurality of lateral ribs circumferentially extending around said inner surface of said barrel wall and axially spaced from each other, and said ribs vary in size.

9. The teatcup liner according to claim 8 wherein each said rib has a radius of curvature taken from said inner surface of said barrel wall, and comprising a series of ribs $R_1$ through $R_n$ progressing from an uppermost rib $R_1$ through a lowermost rib $R_n$, and wherein the radius of curvature of the ribs decreases from $R_1$ through $R_n$.

10. A teatcup liner comprising an upper mouthpiece and a barrel depending downwardly from said upper mouthpiece, said barrel extending axially along an axis for receiving a teat inserted axially thereinto through said mouthpiece, said barrel being defined by a barrel wall having an inner surface defining a hollow interior in said barrel, and an embossed pattern along said inner surface of said barrel wall, wherein said pattern is a recessed pattern having portions recessed into said barrel wall from said hollow interior, said pattern comprises a plurality of dimples, and said dimples vary in size.

11. A teatcup liner comprising an upper mouthpiece and a barrel depending downwardly from said upper mouthpiece, said barrel extending axially along an axis for receiving a teat inserted axially thereinto through said mouthpiece, said barrel being defined by a barrel wall having an inner surface defining a hollow interior in said barrel, and an embossed pattern along said inner surface of said barrel wall, wherein said pattern is a recessed pattern having portions recessed into said barrel wall from said hollow interior, said pattern comprises a plurality of dimples, and said dimples are non-hemispherical.

12. A teatcup liner comprising an upper mouthpiece and a barrel depending downwardly from said upper mouthpiece, said barrel extending axially along an axis for receiving a teat inserted axially thereinto through said mouthpiece, said barrel being defined by a barrel wall having an inner surface defining a hollow interior in said barrel, and an embossed pattern along said inner surface of said barrel wall, wherein said pattern is a recessed pattern having portions recessed into said barrel wall from said hollow interior, and said pattern comprises a plurality of slots extending diagonally relative to said axis.

13. A teatcup liner comprising an upper mouthpiece and a barrel depending downwardly from said upper mouthpiece, said barrel extending axially along an axis for receiving a teat inserted axially thereinto through said mouthpiece, said barrel being defined by a barrel wall having an inner surface defining a hollow interior in said barrel, and an embossed pattern along said inner surface of said barrel wall, wherein said pattern is a recessed pattern having portions recessed into said barrel wall from said hollow interior, and said pattern comprises a chevron pattern comprising a first set of slots extending diagonally relative to said axis, and a second set of slots extending diagonally relative to said axis and obliquely relative to said first set of slots.

14. A teatcup liner comprising an upper mouthpiece and a barrel depending downwardly from said upper mouthpiece, said barrel extending axially along an axis for receiving a teat inserted axially thereinto through said mouthpiece, said barrel being defined by a barrel wall having an inner surface defining a hollow interior in said barrel, and an embossed pattern along said inner surface of said barrel wall, wherein said pattern is a recessed pattern having portions recessed into said barrel wall from said hollow interior, and wherein said pattern comprises a wave shape.

15. The teatcup liner according to claim 14 wherein said wave shape comprises a plurality of peaks alternating with a plurality of valleys axially spaced therebetween.

16. The teatcup liner according to claim 14 wherein said wave shape comprises a plurality of peaks alternating with a plurality of valleys circumferentially spaced therebetween.

17. A teatcup liner comprising an upper mouthpiece and a barrel depending downwardly from said upper mouthpiece, said barrel extending axially along an axis for receiving a teat inserted axially thereinto through said mouthpiece, said barrel being defined by a barrel wall having an inner surface defining a hollow interior in said barrel, and an embossed pattern along said inner surface of said barrel wall, wherein said pattern is a recessed pattern having portions recessed into said barrel wall from said hollow interior, said pattern comprises a plurality of lateral grooves circumferentially extending around said inner surface of said barrel wall and axially spaced from each other, and said grooves vary in size.

18. The teatcup liner according to claim 17 wherein each said groove has a radius of curvature taken from said inner surface of said barrel wall, and comprising a series of grooves $G_1$ through $G_n$ progressing from an uppermost groove $G_1$ through a lowermost groove $G_n$, and wherein the radius of curvature of the grooves increases from $G_1$ through $G_n$.

* * * * *